Jan. 15, 1963  C. N. EDWARDS ET AL  3,073,055
HANDLE FOR SELECTIVELY USABLE FISHING RODS
Filed April 24, 1959  3 Sheets-Sheet 2
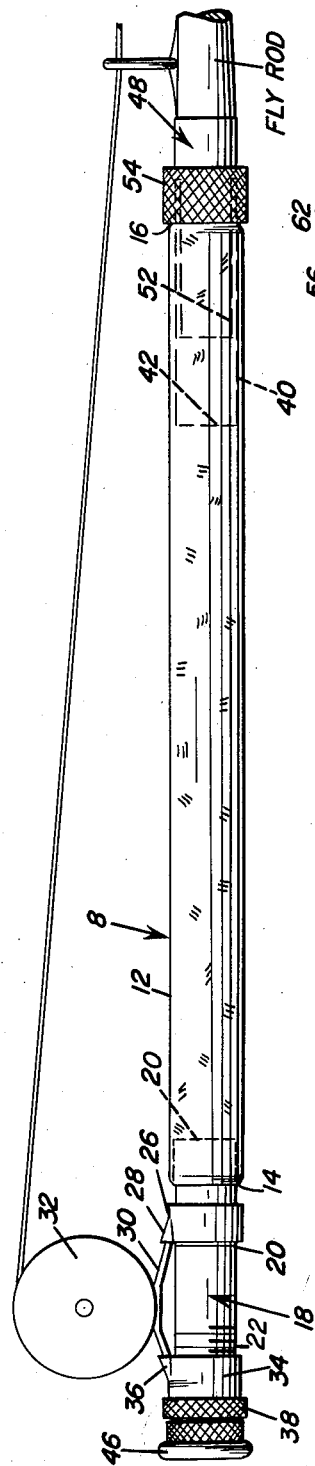
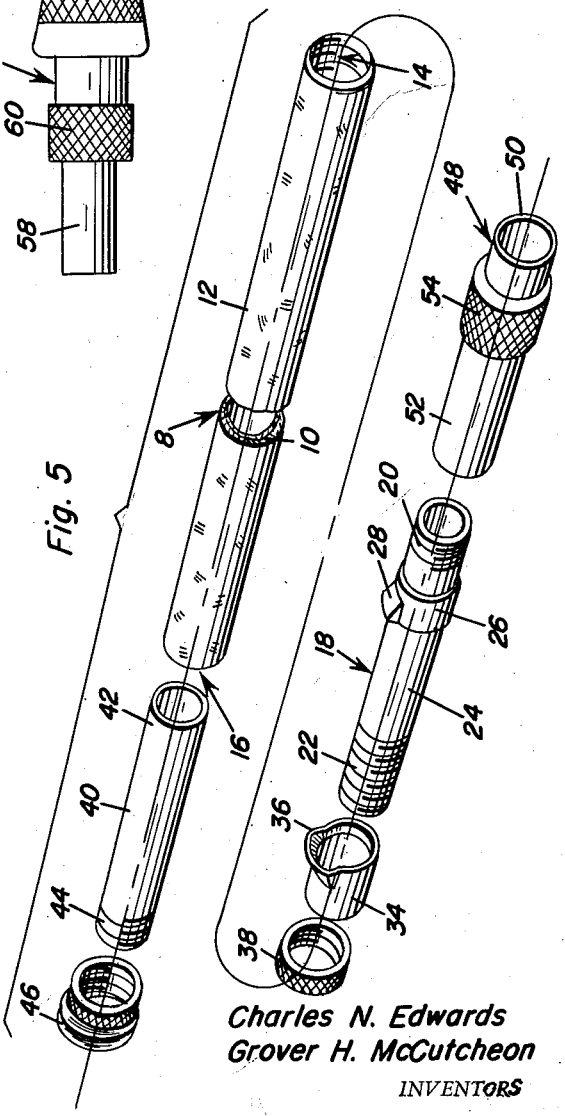
Charles N. Edwards
Grover H. McCutcheon
INVENTORS

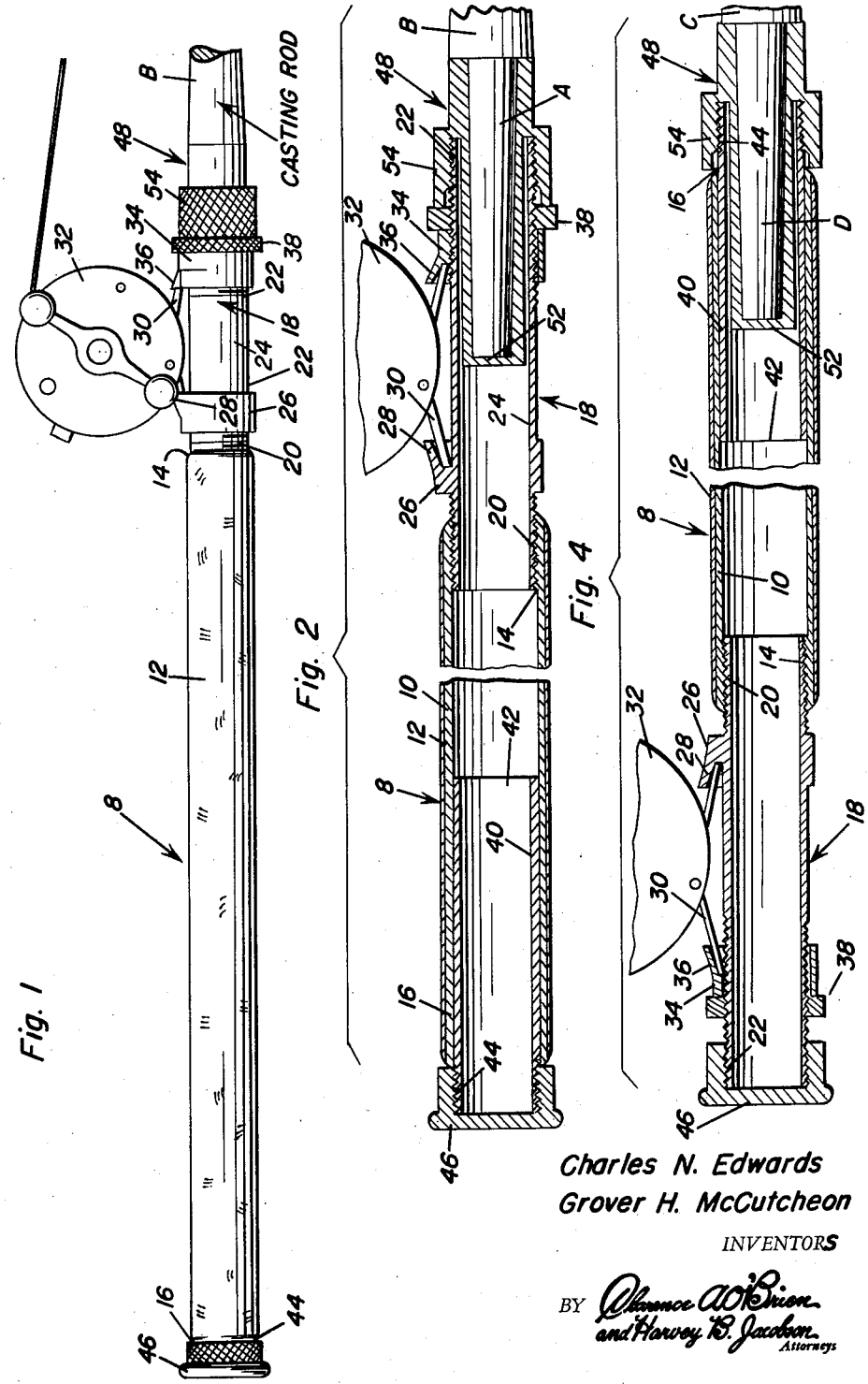

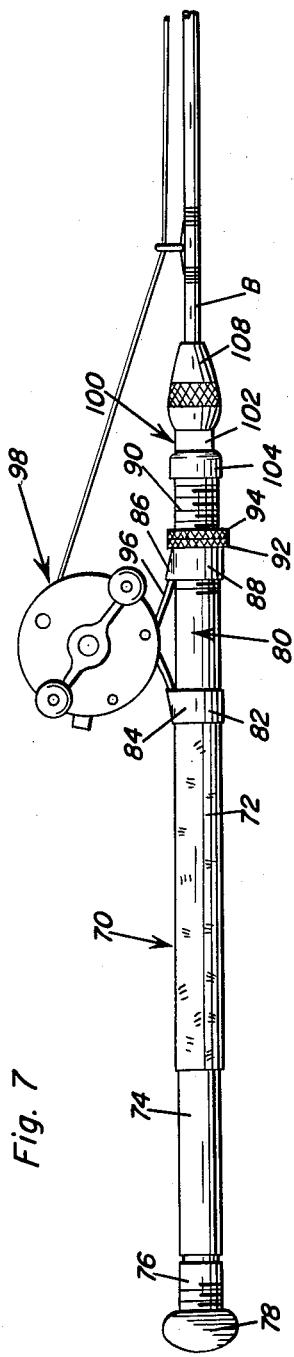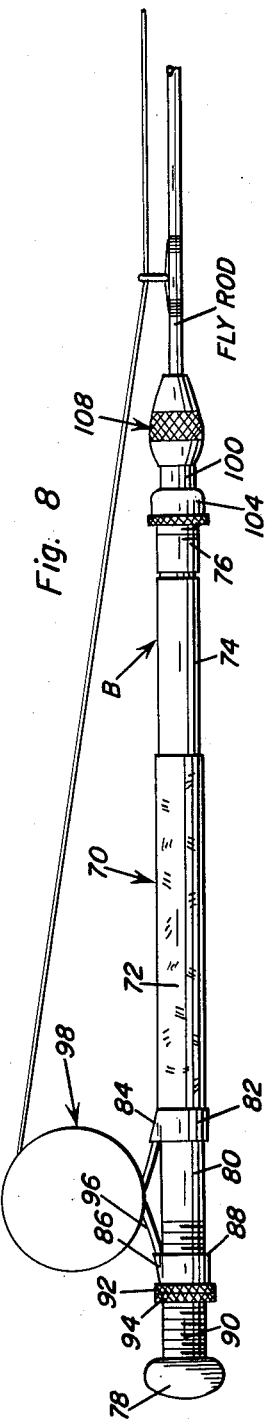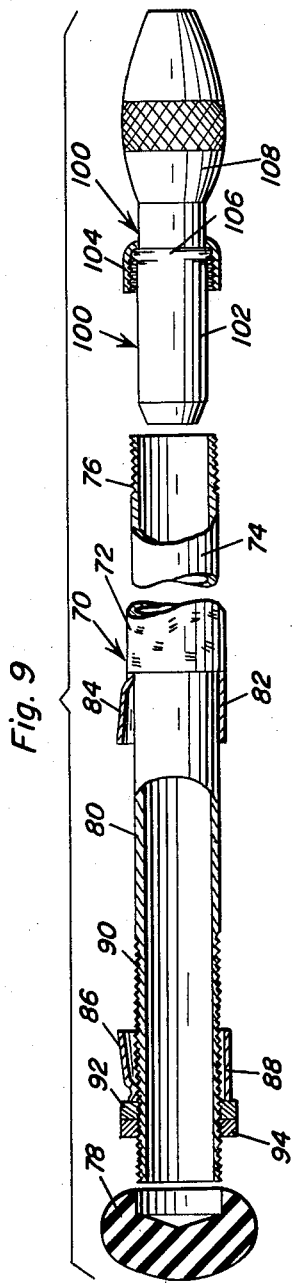
Charles N. Edwards
Grover H. McCutcheon
INVENTORS

United States Patent Office 3,073,055
Patented Jan. 15, 1963

3,073,055
HANDLE FOR SELECTIVELY USABLE
FISHING RODS
Charles N. Edwards, 2513 Cambridge St., and Grover H.
McCutcheon, 1632 W. 20th St., both of Odessa, Tex.
Filed Apr. 24, 1959, Ser. No. 808,698
3 Claims. (Cl. 43—23)

This invention relates, broadly speaking, to an improved implement handle, but more particularly, to a handle of a versatile type for economical use by fishermen, the construction being such that it may be effectually used in supporting selectively usable rods, for example, fly rod, boat rod, surf rod, spinning rod or a casting rod, as varying conditions may require.

As the title of the invention and the preceding paragraph imply, the object of the invention is to provide a simple, practical and highly useful handle construction through the medium of which a user thereof may employ a single handle as a holder and support for the aforementioned different types or kinds of fishing rods. Since the components or parts which go to make up the overall handle construction are properly mated they may be arranged to adapt the handle to accomplish the varying rod using results desired.

Stated otherwise, it is an underlying principle of the basic concept to enable a manufacturer to produce the handle so that the purchaser may buy the handle with one type of a rod and then readily and accommodatingly add the other types of rods from time to time.

One embodiment is that shown in the drawings. This is characterized by a rigid elongated main barrel the ends of which may be open, a complemental sleeve having an outer end screw-threaded, the inner end of said sleeve being telescopically fitted into the other end of the main barrel and having means thereon to mount a fishing line reel thereon, and a fishing rod adapter comprising a socket member closed at one end and adapted to fit telescopically into said sleeve on the one hand or into the auxiliary barrel on the other hand, said socket member having a surrounding screw-threaded collar to encircle either the sleeve or the auxiliary barrel, as the case may be, said collar being connectible to the cooperable screw-threads provided therefor on the sleeve or the auxiliary barrel.

It is also within the purview of the inventive concept to provide a dual purpose handle wherein the respective ends may be reversed so that by facing one end rearwardly or toward the user the reel may be mounted on that end and the adapter and rod on the forward end. Conversely, the then existing "forward" end may be reversed to face toward the rear whereby the respective ends become selectively usable depending on where the reel is to be seated and fastened and the particular kind of rod holding adapter which is to be utilized at the "forward" end.

The specific adaptations and mode of arranging and rearringing the parts to accomplish the variable results and other features and advantages of the over-all invention will become more readily apparent from the following description and the accompanying drawings.

In the drawings, wherein like numerals are employed to designate like parts throughout the views:

FIG. 1 is an elevational view of the properly assembled, ready-to-use handle showing how it is employed to accommodate and support a casting rod, boat rod, surf rod or spinning rod, as the case may be.

FIG. 2 is a view primarily in section and based on FIG. 1 and showing the particular construction and arrangement of parts utilized in this assemblage.

FIG. 3 is a side view similar to FIG. 1 and showing how the parts are rearranged or set up to serve as a holder and support for a fly rod.

FIG. 4 is a sectional view similar to FIG. 2 but tied in with FIG. 3 showing the construction and arrangement of the parts appearing in FIG. 3.

FIG. 5 is an exploded perspective view wherein all of the essential parts or components are shown in a systematic or orderly manner.

FIG. 6 is a detail elevational view of an optionally usable rod adapter embodying a suitably constructed rod holding chuck.

FIG. 7 is a view comparable with FIG. 1 but showing a modification wherein the handle instead of being made up of several components is of one-piece construction.

FIG. 8 is a view of the same construction seen in FIG. 7 except that the "forward" end in FIG. 7 is now faced or directed toward the rear so that the reel is now mounted on the rear seat.

FIG. 9 is a view on an enlarged scale with portions appearing in section and elevation based on the showing or usage of the rod depicted in FIG. 8.

Inasmuch as all of the parts or components are used (except FIG. 6 in particular) in making up the sectional or convertible handle construction they may be treated in a generic sense by making reference first to FIG. 5. Here the numeral 8 designates an elongated main barrel characterized by an open-ended metal or equivalent tube 10 and preferably encased in a cork or an equivalent covering 12. Incidentally, the materials used in construction of the various parts will vary according to the manufacturer's intentions or requirements. The right hand end of the main barrel is denoted at 14 and may be and preferably is internally screw-threaded (FIG. 5). The opposite or left hand end or rearward end may or may not be provided with screw-threads and this end is denoted at 16. The next part is a simple extension for lengthening the main barrel and it is therefore referred to unitarily as an auxiliary barrel 18. Here again an open-ended tube of appropriate material and length is provided. The attachable inner end is provided with screw threads as at 20, and the outer end (the adapter supporting end) with similar screw threads, as at 22. Mounted on the body portion 24 is a fixed encircling band 26 having a keeper 28 therein intended to accommodate an end portion of an attaching bracket or reel seat 30 provided on the attachable and detachable reel 32. (FIGS. 1 to 4 inclusive.) The screw threads 22 serve to accommodate a ring nut 34 with a flared or bell-like mouth 36 which cooperates with the keeper 28 to accommodate the opposite end of the reel seat. The numeral 38 indicates a simple knurled lock nut which functions as shown for example in FIGS. 2 and 4.

The next component or part is a sleeve or ferrule and this is denoted by the numeral 40 and the inner attachable end is denoted at 42 and the other or outer projecting end is preferably screw-threaded as at 44. One purpose of the screw-threads would be to accommodate, for example attachable and detachable closing cap (also called a screw cap) 46. This sleeve is adapted to telescope into the end 16 of the main barrel.

The numeral 48 designates one form of an adapter. This one comprises a hollow tube the outer end 50 of which is open and the inner end of which is closed to provide a socket member 52. On the median portion of the adapter there is a fixed suitably knurled internally screw-threaded attaching and coupling collar 54 and this is used in the manner seen perhaps best in FIGS. 2 and 4.

With reference now to FIG. 6 the adapter here shown is an alternate for the adapter 48 and it is denoted by the numeral 56. Here again it comprises a closed socket member 58 at the left and a knurled screw-threaded attaching collar 60 on the median portion. The right hand end portion is provided with a suitable chuck 62 (not detailed).

As will be evident from the drawings one arrangement of the parts in assembled handle-forming relationship is seen in FIGS. 1 and 2 and another arrangement is seen in FIGS. 3 and 4. The arrangement in FIGS. 1 and 2 is that which is employed in constructing the holder for a boat rod, a surf rod, a spinning rod or a casting rod as the case may be. While it is apparent from the reference numerals just what parts are in their intended or given position it will perhaps be first noticed that the reel is mounted on the handle toward the right or forward portion of the handle. In the reversed arrangement or mode of use in FIGS. 3 and 4, the reel is at the reverse or rearward end. Reverting to FIGS. 1 and 2 and particularly FIG. 2 the showing illustrates the aforementioned sleeve 40 with its inner end 42 friction-fitted telescopically into the end 16 of the main barrel. The screw-threaded end 44 protrudes to accommodate the screw-threads on the screw cap 46 which then constitutes a suitable closure. The auxiliary shorter barrel 18 (reversed from its position in FIG. 5) is at the front, the screw-threaded end portion 20 having been threaded into the end portion 14. The reel is shown mounted and held in place by the components 28 and 36 respectively. The jam or lock nut 38 comes into play here. The projecting end portion 22 now becomes a socket and serves to accommodate the closed socket member 52 which is secured in place in the manner shown. That is to say, the collar 54 encircles and is screwed on the screw-threads 22. Consequently, with this adapter 48 applied the reduced shank A of the fishing rod B is suitably and removably held in place. It can be assumed here that the rod B is a casting rod.

A similar result had in making up a fly rod is seen in FIGS. 3 and 4. It will be noted for example in FIG. 4 that the auxiliary barrel (formerly at the right or front) has been reversed and is now on the rearward or left hand end of the main barrel. Under this arrangement the screw-threads 22 accommodate the screw cap 46 which instead of being screwed on the sleeve 40 (as before) is unscrewed from the threads 44 and is now screwed on and closes the otherwise open end of the auxiliary barrel 18. The screw-threaded end portion 20 remains screwed in the socket 14 of the main barrel. The position of sleeve 40 is now reversed (or at the front). In this arrangement (FIG. 4) the screw-threads 44 now come into play to accommodate the screw-threads on the interior of the attaching or coupling collar 54. The fly rod is denoted at C and the reduced stem or shank at D. It will be evident therefore that the properly constructed, proportioned and mated components depicted in the exploded illustration in FIG. 5 may be arranged as shown in FIGS. 2 and 4 respectively in order to provide reel positioning and handling means for the varying types of fishing rods. If one desires to utilize the chuck 62 on its adapter 56 (FIG. 6) this particular adapter 56 will simply be substituted for the adapter 48 in what is believed to be an obvious manner.

With reference now to the modified embodiment of the invention depicted in FIGS. 7, 8 and 9 it will be noticed that FIG. 7 corresponds with FIG. 1 insofar as the reel position and casting rod adapter is involved.

FIG. 8 compares as is obvious with the fly rod arrangement seen for example in FIG. 3. As already stated FIG. 9 is a fragmentary sectional and elevational view based on FIG. 8 with the reel and its base or bracketing means omitted. A strict comparison of these particular FIGURES and then further comparing with, let us say, FIGS. 2 and 4 respectively it will be noticed that the chief thing about this modification is that the handle proper instead of comprising the barrel 8 with the ends 14 and 16 and with the separate auxiliary barrel 18 and separate insertable and removable sleeve 40, a one-piece tube is utilized. The main barrel or body portion of this tube is denoted in FIGS. 7, 8 and 9 by the numeral 70 and a cork or an equivalent grip is provided at 72. The left end or inner end extension of the tube is denoted in FIG. 7 by the numeral 74 and has a threaded open end 76 to accommodate the closing cap 78. This cap may be either screwed on or fitted frictionally. The extension at the forward end or to the right in FIG. 7 is conveniently denoted by the numeral 80 and has a fixedly secured collar 82 with a reel seat 84 for cooperation with a similar seat 86 on the collar 88 which is screwed in place on the threads 90 as at 92. The numeral 94 designates a simple lock nut. In any event, the seats 84 and 86 serve to accommodate the arms of the foot or bracket 96 of the reel 98. Here the adapter is denoted at 100 and the tubular body or sleeve portion 102 is fitted telescopically and removably into the open end of the extended end portion 80. This sleeve is held in place by a swivelled ring-nut 104 which in turn is held in place on the shoulder 106 in the manner seen in FIG. 9. The chuck on this adapter is denoted generally at 108 and serves to accommodate the fishing rod, that is the casting rod B. Obviously, this "set up" can be reversed and the end of the rod seen at the right in FIG. 7 may be swung around bodily and brought to the rear so that it then becomes the rearward or inward end. To do this it is necessary to unscrew and remove the adapter 100. Also the cap 78 which was previously on the end portion 74 is removed and it is then fitted over the threaded end portion 90 in place of the adapter as before. By the same token the then open-end of the extension 74 in FIG. 8 provides a "socket" for removable reception and retention of the adapter 100. The same screw-threads 76 now serve, not for the cap 78 as before, but rather for the ring nut 104 on the adapter 100 all as brought out in FIGS. 7, 8 and 9. It follows that the handle may be made up of sections (FIGS. 1 to 6, inclusive) which are separable and wherein the sections may be made of different classes and kinds and costs of materials; or the entire handle may be of one-piece construction with, of course, the features of the invention added thereto as particularly evident in FIGS. 7, 8 and 9.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fly rod handle comprising an elongated rigid main barrel having rearward and forward end portions, an auxiliary barrel having an end thereof removably mounted on the rearward end of said main barrel, serving as an axial extension thereof and supporting a fishing line reel, a fly rod adapter having a socket member for reception and retention of an end of the fly rod, and means integral with the socket member and threaded removably on the forward end portion of said main barrel, said means comprising a sleeve integral with the adapter having internal threads mating with external threads on the forward end of said main barrel, the other end of said auxiliary barrel having external threads identical in size to said external threads on said forward end portion of said main barrel, a cap screwed on the threads of said auxiliary barrel, said cap and adapter being reversible on said handle.

2. A knockdown-type handle for various types of fishing rods comprising a rigid elongated main hollow barrel the ends of which are open, a complemental sleeve having an outer end screw-threaded, the inner end of said sleeve being adapted to be telescopically and removably fitted to one end of said main barrel, a companion screw cap which may be optionally screwed on the screw-threaded end of said sleeve, an auxiliary barrel complemental to the main barrel and which may be used to extend the length of the main barrel, said auxiliary barrel being of a cross-section that the ends thereof may be telescopically fitted selectively into the ends of the main barrel and having screw threaded ends, means on said auxiliary barrel to mount a fishing line reel thereon, and a fishing rod adapter comprising a socket member closed at one end and adapted to fit telescopically into said sleeve on the one hand or to fit correspondingly into the auxiliary barrel on the other hand, said socket member having a surrounding screw-threaded collar to engage either said screw threaded outer end of the sleeve or one of said screw threaded ends of the auxiliary barrel, as the case may be.

3. A handle for readily attachable and detachable selectively usable fishing rods comprising, in combination, an elongated rigid main barrel open at its forward and rearward ends and providing selectively usable forward and rearward sockets therein, an auxiliary barrel shorter than and complemental to said main barrel having one end portion thereof removably fitted into the forward socket of the main barrel whereby to constitute an axial extension of the latter, a reel, means removably mounting said reel on the intermediate portion of said auxiliary barrel, a fishing rod adapter removably mounted on the forward end of the auxiliary barrel for supporting and mounting a predetermined type of a fishing rod on said barrels, a ferrule-like sleeve telescopically and removably mounted in the rearward socket of said main barrel, and an end cap removably mounted on said sleeve at the rear end of the main barrel, said auxiliary barrel and ferrule-like sleeve being of the same external diameter whereby said end cap and said fishing rod adapter may be reversed on the handle section to vary the position of the reel relative to said end cap.

References Cited in the file of this patent

UNITED STATES PATENTS

| | | |
|---|---|---|
| 828,557 | Levison | Aug. 14, 1906 |
| 1,965,796 | Dunkelberger | July 10, 1934 |
| 2,835,245 | Morgan | May 20, 1958 |
| 2,853,724 | Smith | Sept. 30, 1958 |

FOREIGN PATENTS

| | | |
|---|---|---|
| 489,079 | Great Britain | July 19, 1938 |
| 1,064,979 | France | May 19, 1954 |